US008245696B2

(12) United States Patent
Hofmann et al.

(10) Patent No.: US 8,245,696 B2
(45) Date of Patent: Aug. 21, 2012

(54) AREA OF INTERSECTION BETWEEN A HIGH-PRESSURE CHAMBER AND A HIGH-PRESSURE DUCT

(75) Inventors: Dominikus Hofmann, Fuessen (DE); Nadja Eisenmenger, Stuttgart (DE); Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 12/596,589

(22) PCT Filed: Apr. 7, 2008

(86) PCT No.: PCT/EP2008/054167
§ 371 (c)(1), (2), (4) Date: Oct. 19, 2009

(87) PCT Pub. No.: WO2008/128881
PCT Pub. Date: Oct. 30, 2008

(65) Prior Publication Data
US 2010/0116251 A1 May 13, 2010

(30) Foreign Application Priority Data
Apr. 19, 2007 (DE) ........................ 10 2007 018 471

(51) Int. Cl.
*F02M 55/02* (2006.01)
*F16L 39/00* (2006.01)

(52) U.S. Cl. .................... 123/456; 123/468; 285/133.11

(58) Field of Classification Search .................. 123/456, 123/468, 469; 285/133.11, 134.1, 179, 288.8, 285/328, 334.4, 334.5
See application file for complete search history.

(56) References Cited

U.S. PATENT DOCUMENTS 4,893,601 A * 1/1990 Sugao ........................... 123/468
5,018,499 A * 5/1991 Usui ............................. 123/456
5,038,738 A * 8/1991 Hafner et al. ................. 123/470
5,072,710 A * 12/1991 Washizu ....................... 123/470
5,775,302 A * 7/1998 Guido et al. .................. 123/468
6,082,333 A * 7/2000 Vattelana et al. ............ 123/456
(Continued)

FOREIGN PATENT DOCUMENTS

DE 19949962 A1 4/2001
(Continued)

*Primary Examiner* — Thomas Moulis

(57) ABSTRACT

The invention relates to an area of intersection between a high-pressure chamber and a high-pressure duct. To increase the strength in the area of intersection, it is possible to round the area of intersection. The area of intersection includes at least one planar area or an area that is curved markedly less than the remaining area of intersection. The planar area may also be embodied as only nearly planar. The high-pressure chamber and the high-pressure duct are also called functional chambers. By means of the planar or nearly planar area, an intersection geometry is created, in which tensile stresses of the functional chambers that occur upon subjection to pressure are not superimposed directly and add up as they do in conventional intersection geometries. By means of the planar area in the area of intersection, it is attained that in the intersection geometry of the invention, under pressure, local pressure stresses or markedly reduced tensile stresses occur in an inner wall of the high-pressure chamber and are then superimposed with the tensile stresses in an inner wall of the high-pressure duct. Since with the intersection geometry of the invention, a tensile stress has only a reduced tensile stress or in the best case a pressure stress superimposed on it, the total is less and hence the maximum stress that occurs is reduced markedly.

33 Claims, 2 Drawing Sheets

U.S. PATENT DOCUMENTS

| | | | | |
|---|---|---|---|---|
| 6,126,208 | A * | 10/2000 | Asada et al. | 285/133.4 |
| 6,186,119 | B1 * | 2/2001 | Ciecko | 123/456 |
| 6,196,192 | B1 * | 3/2001 | Ciecko | 123/456 |
| 6,213,095 | B1 * | 4/2001 | Asada et al. | 123/456 |
| 6,263,862 | B1 * | 7/2001 | Asada et al. | 123/456 |
| 6,408,826 | B2 * | 6/2002 | Asada et al. | 123/468 |
| 6,470,856 | B1 * | 10/2002 | Boecking | 123/456 |
| 6,497,219 | B2 * | 12/2002 | Natsume | 123/468 |
| 6,497,220 | B1 * | 12/2002 | Boecking | 123/469 |
| 6,513,498 | B1 * | 2/2003 | Frank | 123/456 |
| 6,557,786 | B1 | 5/2003 | Frank | |
| 6,604,510 | B2 * | 8/2003 | Scollard et al. | 123/470 |
| 6,612,289 | B1 | 9/2003 | Frank et al. | |
| 6,634,335 | B2 * | 10/2003 | Boecking et al. | 123/456 |
| 6,789,528 | B2 * | 9/2004 | Endo | 123/468 |
| 6,843,275 | B2 * | 1/2005 | Kato | 138/109 |
| 6,889,660 | B2 * | 5/2005 | Usui et al. | 123/456 |
| 6,923,160 | B2 * | 8/2005 | Wirkowski et al. | 123/456 |
| 7,021,291 | B2 * | 4/2006 | Denton et al. | 123/456 |
| 7,213,577 | B2 * | 5/2007 | Hummel et al. | 123/469 |
| 7,278,400 | B2 * | 10/2007 | Denton et al. | 123/456 |
| 7,318,418 | B2 * | 1/2008 | Usui et al. | 123/468 |
| 7,699,041 | B2 * | 4/2010 | Colletti et al. | 123/456 |
| 7,900,603 | B2 * | 3/2011 | Hasegawa et al. | 123/456 |
| 7,905,216 | B2 * | 3/2011 | Kutsukake et al. | 123/456 |
| 2002/0112697 | A1 | 8/2002 | Knoedl et al. | |
| 2002/0113150 | A1 | 8/2002 | Boecking et al. | |
| 2004/0080156 | A1 | 4/2004 | Usui | |
| 2006/0260124 | A1 | 11/2006 | Usui | |

FOREIGN PATENT DOCUMENTS

| | | | |
|---|---|---|---|
| DE | 19949963 | A1 | 4/2001 |
| DE | 10012961 | A1 | 9/2001 |
| DE | 10056405 | A1 | 5/2002 |
| DE | 10140058 | A1 | 10/2002 |
| DE | 10340070 | A1 | 3/2004 |
| EP | 1296054 | A1 | 3/2003 |
| EP | 1413744 | A1 | 4/2004 |

* cited by examiner

AREA OF INTERSECTION BETWEEN A HIGH-PRESSURE CHAMBER AND A HIGH-PRESSURE DUCT

CROSS-REFERENCE TO RELATED APPLICATION

This application is a 35 USC 371 application of PCT/EP2008/054167 filed on Apr. 7, 2008.

BACKGROUND OF THE INVENTION

1. Field of the Invention

The invention relates to an area of intersection between a high-pressure chamber and a high-pressure duct.

2. Object and Summary of the Invention

To increase the strength in the area of intersection, it is possible to round the area of intersection.

It is the object of the invention to increase the high-pressure strength in the area of intersection between a high-pressure chamber and a high-pressure duct.

The object is attained, in an area of intersection between a high-pressure chamber and a high-pressure duct, in that the area of intersection includes at least one planar area or an area that is curved markedly less than the remaining area of intersection. The planar area may also be embodied as only nearly planar. The high-pressure chamber and the high-pressure duct are also called functional chambers. By means of the planar or nearly planar area, an intersection geometry is created, in which tensile stresses of the functional chambers that occur upon subjection to pressure are not superimposed directly and add up as they do in conventional intersection geometries. By means of the planar area in the area of intersection, it is attained that in the intersection geometry of the invention, under pressure, local pressure stresses or markedly reduced tensile stresses occur in an inner wall of the high-pressure chamber and are then superimposed with the tensile stresses in an inner wall of the high-pressure duct. Since with the intersection geometry of the invention, a tensile stress has only a reduced tensile stress or in the best case a pressure stress superimposed on it, the total is less and hence the maximum stress that occurs is reduced markedly.

A preferred exemplary embodiment of the area of intersection is characterized in that the high-pressure duct has a smaller diameter than the high-pressure chamber. The high-pressure chamber is preferably a chamber in an injector housing of a fuel injector that is filled with fuel at high pressure via a high-pressure inlet.

A further preferred exemplary embodiment of the area of intersection is characterized in that a cylindrical jacket face of the high-pressure chamber in the area of intersection has either the planar area or the area that is curved markedly less than the remaining area of intersection. In an essential aspect of the invention, the cross section of the high-pressure chamber is advantageously varied by removal of material, in such a way that a planar or nearly planar area is created.

A further preferred exemplary embodiment of the area of intersection is characterized in that the high-pressure duct in the planar area discharges into the high-pressure chamber. The exit from the high-pressure duct is shifted, in an essential aspect of the invention, into or to the planar or nearly planar area.

Further preferred exemplary embodiments of the area of intersection are characterized in that the area of transition between the planar area and the high-pressure chamber or the high-pressure duct is rounded. As a result, unwanted stresses can be reduced still further.

A further preferred exemplary embodiment of the area of intersection is characterized in that the planar area extends parallel to the longitudinal axis of the high-pressure chamber. Preferably, the planar area extends over a portion of the length of the high-pressure duct and then changes over into a cylindrical jacket face. The planar area may, however, also extend over the entire length of the high-pressure duct.

A further preferred exemplary embodiment of the area of intersection is characterized in that the high-pressure chamber, viewed in cross section, has two circular arcs, which on one end change over into the planar area. The circular arcs are preferably semicircles, which on their ends opposite the planar area are joined by means of a further planar or nearly planar area.

A further preferred exemplary embodiment of the area of intersection is characterized in that the high-pressure chamber, viewed in cross section, has two elliptical arcs, which on one end change over into the planar area. Preferably, the planar area is disposed parallel to the main axis of the ellipses to which the two elliptical arcs belong.

A further preferred exemplary embodiment of the area of intersection is characterized in that the high-pressure chamber, viewed in cross section, has two further planar areas, which are disposed perpendicular to the planar area from which they originate and change over into the cylindrical jacket face. The three planar areas form a U-shaped cross section with a base and two legs. The high-pressure duct discharges into the base. The two legs change over into the cylindrical jacket face, which in the area of intersection is reduced to a semicircular cross section.

Further advantages, characteristics and details of the invention will become apparent from the ensuing description, in which various exemplary embodiments are described in detail in conjunction with the drawings.

BRIEF DESCRIPTION OF THE DRAWINGS

The invention will be described in further detail below in conjunction with the drawings, in which.

DESCRIPTION OF THE PREFERRED EMBODIMENTS

In each of FIGS. 1 through 5, a component of a magnetic valve device is shown in section. The component is part of an injector housing of a fuel injector that serves to inject fuel, subjected to high pressure, into a combustion chamber of an internal combustion engine.

Figure 1:
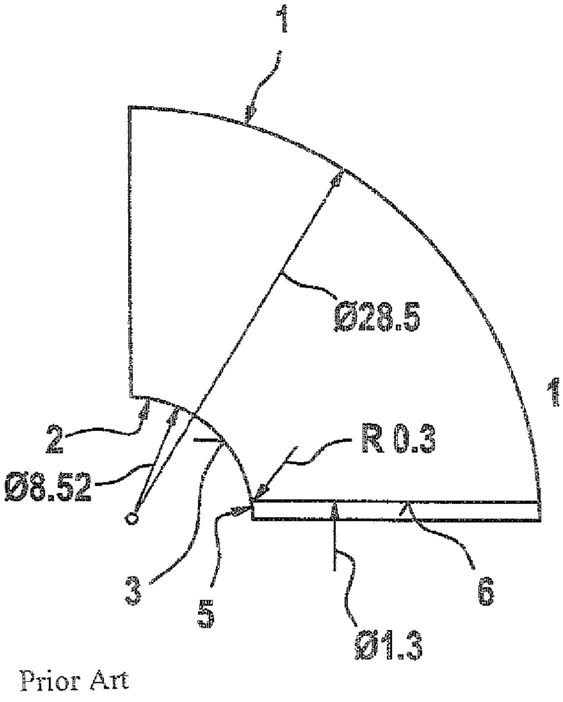
FIG. 1 shows a conventional component with an area of intersection in quarter section.

In FIG. 1, a conventional injector housing 1 with a high-pressure bore 2, also called a high-pressure duct, is shown in cross section and quarter section, respectively. The high-pressure bore 2, in the high-pressure bore portion 3 shown, has an inner diameter of 8.52 mm. The injector housing 1 has an outer diameter of 28.5 mm. The high-pressure bore portion 3 is in the shape of a circular-cylindrical jacket face, whose longitudinal axis extends perpendicular to the plane of the drawing. In an area of intersection 5, a high-pressure bore 6, also called a high-pressure duct, extending transversely to the cylindrical jacket face, discharges into the high-pressure bore portion 3. The high-pressure bore 6 has a diameter of 1.3 mm. The area of transition between the high-pressure bore 6 and the high-pressure bore portion 3, which is also called the area of intersection 5, is rounded, with a radius R of 0.3 mm.

In hydraulic systems, various chambers have to be subjected to pressure and relieved again. The connections between a smaller bore, such as a high-pressure inlet into a pressure chamber, such as the interior of a fuel injector, are subjected to extremely high pressures. The high-pressure chamber is as a rule a bore. The high-pressure inlet line is likewise a bore. The point of intersection between the high-pressure chamber and the bore is usually what is loaded the most severely.

At the pressures in fuel injectors that are currently usual, the attempt is made, as shown in FIG. 1, by way of rounding the area of intersection 5 to lower the component stresses to a permissible range. Moreover, the attempt is made to reduce the component stresses by way of different angles between the bores. In most intersection geometries, under pressure in the area of intersection, tensile stresses occur at the inner wall of the high-pressure bore or high-pressure bore portion or high-pressure duct. In the area of intersection, these tensile stresses are locally superimposed on one another and added together, resulting in peak stresses. By way of various entry angles between the inlet bore or high-pressure duct and the high-pressure chamber, it is attained that the exit point from the small bore becomes not round but elliptical. Since the tangential tensile stresses are thus more favorably deflected, the notch effect can be reduced.

In the present invention, the cross section of the intrinsically cylindrical high-pressure bore portion is changed locally in such a way that at least an approximately plane face is created in the area of intersection. The plane face is preferably formed by removal of material but can also be formed by adding material. The exit from the high-pressure inlet bore is located at this nearly plane face.

When the fuel injector or the high-pressure bore portion is subjected to pressure, then the internal geometry, as in every container, might under internal pressure assume a circular cross section. This causes bulging of the initially plane face outward, which on the inside generates pressure stresses. The inlet bore with its circular cross section moreover causes tensile stresses on its inside. However, these no longer have the usual tensile stresses of the high-pressure chamber superimposed on them at the exit point, but instead, pressure stresses or slight tensile stresses in the region of the flattening are superimposed on them. As a result, unwanted excessive stresses can be avoided.

Figure 2:
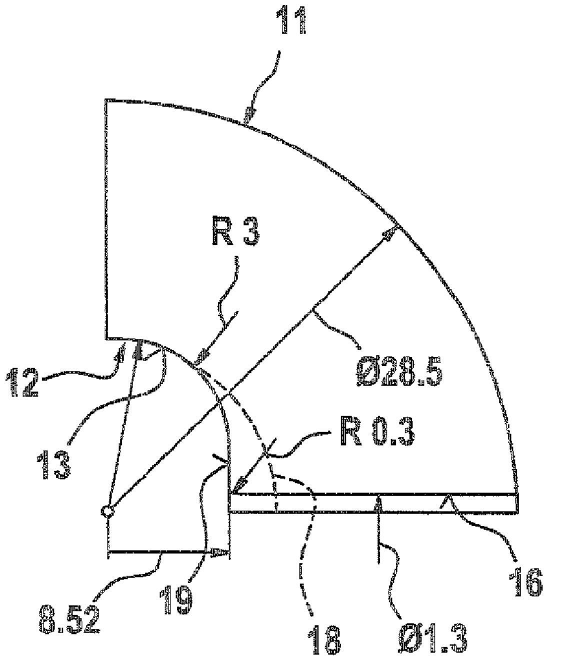
FIG. 2 shows a component with an area of intersection of the invention in quarter section.

In FIG. 2, an injector housing 11 according to the invention is shown, with a high-pressure bore 12 that is also called a high-pressure chamber. The injector housing 11 has an outer diameter of 28.5 mm. In other words, the injector housing 11 has the same outer diameter as the injector housing 1 shown in FIG. 1. The high-pressure bore 12 includes a high-pressure bore portion 13 with an inner diameter of 12 mm. The inner diameter of the high-pressure bore 12 is thus somewhat greater than in the injector housing 1 shown in FIG. 1.

A transversely extending high-pressure bore 16, also called a high-pressure duct, discharges into the high-pressure bore portion 13 in an area of intersection. The high-pressure bore 16 has the same diameter as in the injector housing 1 shown in FIG. 1, namely 1.3 mm. A circular arc 18 shown in dashed lines indicates a circular-cylindrical jacket face in the high-pressure bore portion 13. In an essential aspect of the invention, in the area of intersection a planar area 19 is embodied, in which the high-pressure bore 16 discharges into the high-pressure bore portion 13. The area of transition between the planar area 19 and the high-pressure bore portion 13 is rounded, specifically with a radius of 3 mm. The area of transition between the planar area 19 and the high-pressure bore 16 is likewise rounded, specifically with a radius of 0.3 mm. The planar area 19 extends perpendicular to the plane of the drawing and parallel to the longitudinal axis of the high-pressure bore 12. In the exemplary embodiment shown in FIG. 2, the spacing between the planar area 19 and the longitudinal axis of the high-pressure bore 12 is 8.52 mm.

By means of the intersection geometry shown in FIG. 2, safety margins that are greater than two can be attained in the region of the bore intersection. As a result, the component in this region becomes noncritical. Only somewhat farther away from the area of intersection and thus away from the region of the pressure stresses do relevant stresses occur, although with safety margins of around 1.5 or more, they are likewise within the permissible range.

Figure 3:
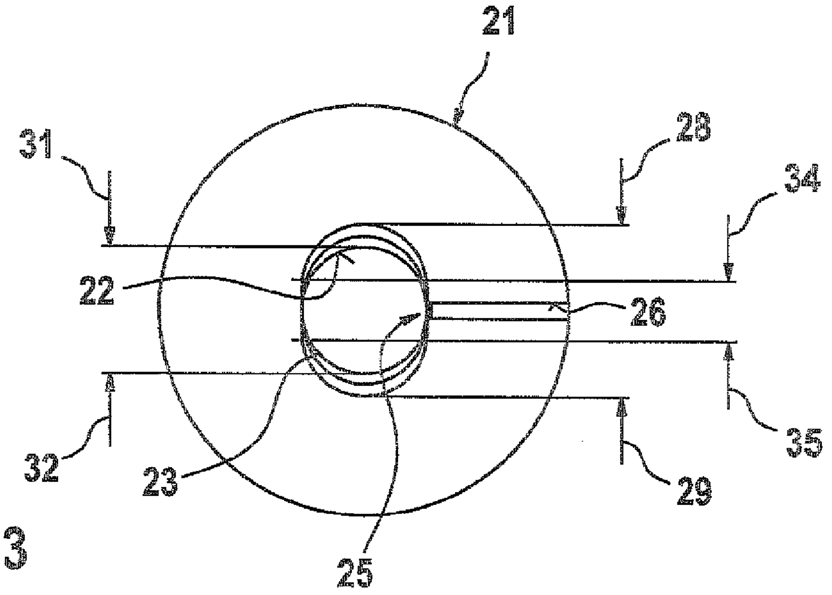
FIG. 3 shows a component in a further exemplary embodiment with two diametrically opposed planar areas in cross section.

In FIG. 3, an injector housing 21 is shown in cross section, with a high-pressure bore 22 that is also called a high-pressure chamber. The high-pressure bore 22 includes a high-pressure bore portion 23, whose cross section is changed according to the invention in an area of intersection 25 in which a high-pressure bore 26, also called a high-pressure duct, discharges into the high-pressure bore portion 23. Dimensioning arrows 28 and 29 indicate the intersection geometry according to the invention. Further dimensioning arrows 31, 32 indicate the original cylindrical geometry. Still other dimensioning arrows 34, 35 indicate two diametrically opposed planar areas. In one of the planar areas, the high-pressure bore 26 discharges into the high-pressure bore portion 23. The second planar area is disposed precisely diametrically opposite the region of the orifice of the high-pressure bore 26.

Figure 4:
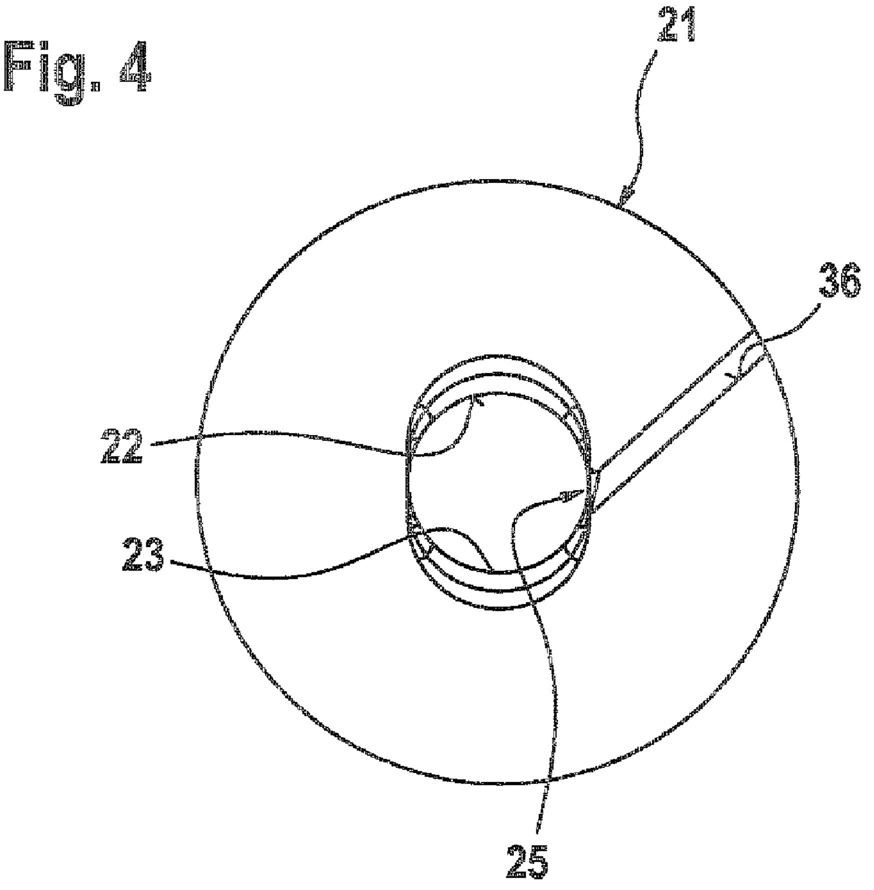
FIG. 4 shows a component in a further exemplary embodiment in cross section, with an obliquely extending high-pressure bore.

In FIG. 4, a similar injector housing 21 to FIG. 3 is shown in cross section. In a distinction from the preceding exemplary embodiment, in the exemplary embodiment shown in FIG. 4 a high-pressure bore 36, also called an inlet bore or high-pressure duct, is supplied obliquely, which leads to reduced stresses at the inner wall of the inlet bore. Besides an altered side angle, as shown in FIG. 4, the high-pressure bore 36 may in addition or alternatively be supplied with an angle of elevation that is other than 90 degrees.

Figure 5:
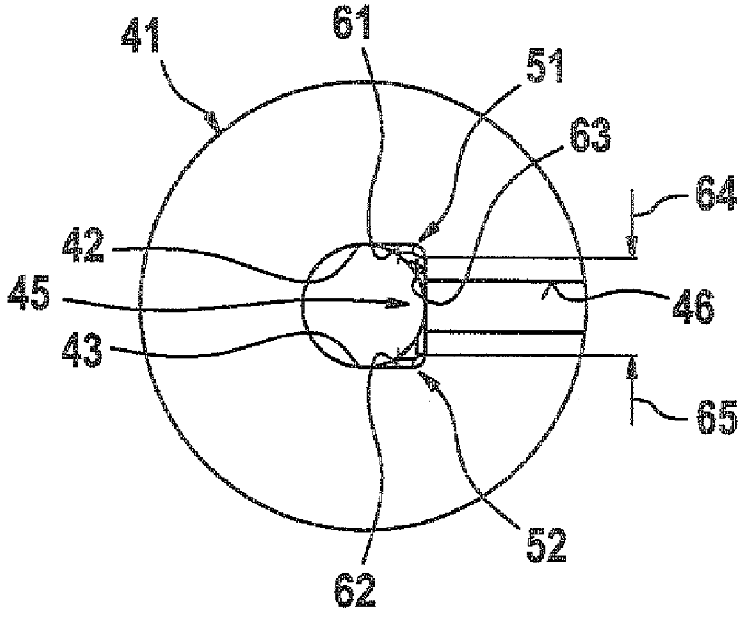
FIG. 5 shows a component in a further exemplary embodiment in cross section, with three planar areas.

In FIG. 5, an injector housing 41 with a high-pressure bore 42 or high-pressure duct 42 is shown in cross section. The high-pressure bore 42 includes a high-pressure bore portion 43 that essentially has the shape of a circular-cylindrical jacket. In an area of intersection 45, a transversely extending high-pressure bore 46, also called a high-pressure duct, discharges into the high-pressure bore portion 43. At two locations 51, 52 where material is removed, the original circular-cylindrical-jacketlike shape of the high-pressure bore 43 is altered such that three planar areas 61, 62 and 63 are created. The two planar areas 61 and 62 extend parallel to the high-pressure bore 46 and change over tangentially to the high-pressure bore portion 43.

The planar area 63 extends between two dimensioning arrows 64 and 65 perpendicular to the high-pressure bore 46, which discharges into the high-pressure bore portion 43 inside the planar area 63. The three planar areas 61 through 63, in the area of intersection 45, form a substantially U-shaped cross section. The planar area 63 represents the base of the U-shaped cross section. The two planar areas 61 and 62 form the legs of the U-shaped cross section, and the areas of transition between the planar areas 61, 62 and the planar area 63 are rounded.

The foregoing relates to the preferred exemplary embodiments of the invention, it being understood that other variants and embodiments thereof are possible within the spirit and scope of the invention, the latter being defined by the appended claims.

The invention claimed is:

1. An injector housing with an area of intersection between a high-pressure chamber and a high-pressure duct, the area of intersection having at least one planar area or an area that is curved markedly less than a remaining area of intersection, the high-pressure duct has a smaller diameter than the high-pressure chamber, and wherein the high-pressure chamber, viewed in cross section, has two circular arcs, which on one end change over into the planar area.

2. The injector housing with an area of intersection as defined by claim 1, wherein a cylindrical jacket face of the high-pressure chamber in the area of intersection has either the planar area or the area that is curved markedly less than the remaining area of intersection.

3. The injector housing with an area of intersection as defined by claim 1, wherein the high-pressure duct in the planar area discharges into the high-pressure chamber.

4. The injector housing with an area of intersection as defined by claim 2, wherein the high-pressure duct in the planar area discharges into the high-pressure chamber.

5. The injector housing with an area of intersection as defined by claim 1, wherein an area of transition between the planar area and the high-pressure chamber is rounded.

6. The injector housing with an area of intersection as defined by claim 2, wherein an area of transition between the planar area and the high-pressure chamber is rounded.

7. The injector housing with an area of intersection as defined by claim 3, wherein an area of transition between the planar area and the high-pressure chamber is rounded.

8. The injector housing with an area of intersection as defined by claim 1, wherein the area of transition between the planar area and the high-pressure duct is rounded.

9. The injector housing with an area of intersection as defined by claim 2, wherein the area of transition between the planar area and the high-pressure duct is rounded.

10. The injector housing with an area of intersection as defined by claim 3, wherein the area of transition between the planar area and the high-pressure duct is rounded.

11. The injector housing with an area of intersection as defined by claim 5, wherein the area of transition between the planar area and the high-pressure duct is rounded.

12. The injector housing with an area of intersection as defined by claim 1, wherein the planar area extends parallel to a longitudinal axis of the high-pressure chamber.

13. The injector housing with an area of intersection as defined by claim 11, wherein the planar area extends parallel to a longitudinal axis of the high-pressure chamber.

14. An injector housing with an area of intersection as defined by claim 4, wherein an area of transition between the planar area and the high-pressure duct is rounded.

15. An injector housing with an area of intersection as defined by claim 5, wherein the area of transition between the planar area and the high-pressure duct is rounded.

16. An injector housing with an area of intersection as defined by claim 6, wherein the area of transition between the planar area and the high-pressure duct is rounded.

17. An injector housing with an area of intersection as defined by claim 7, wherein the area of transition between the planar area and the high-pressure duct is rounded.

18. An injector housing with an area of intersection between a high-pressure chamber and a high-pressure duct, the area of intersection having at least one planar area or an area that is curved markedly less than a remaining area of intersection, the high-pressure duct has a smaller diameter than the high-pressure chamber, and wherein the high-pressure chamber, viewed in cross section, has two further planar areas, which are disposed perpendicular to said at least one planar area from which they originate and change over into a cylindrical jacket face.

19. The injector housing with an area of intersection as defined by claim 18, wherein the high-pressure duct in the planar area discharges into the high-pressure chamber.

20. The injector housing with an area of intersection as defined by claim 19, wherein an area of transition between the planar area and the high-pressure chamber is rounded.

21. The injector housing with an area of intersection as defined by claim 19, wherein an area of transition between the planar area and the high-pressure duct is rounded.

22. The injector housing with an area of intersection as defined by claim 20, wherein the area of transition between the planar area and the high-pressure duct is rounded.

23. The injector housing with an area of intersection as defined by claim 19, wherein the planar area extends parallel to a longitudinal axis of the high-pressure chamber.

24. The injector housing with an area of intersection as defined by claim 20, wherein the planar area extends parallel to a longitudinal axis of the high-pressure chamber.

25. The injector housing with an area of intersection as defined by claim 21, wherein the planar area extends parallel to a longitudinal axis of the high-pressure chamber.

26. The injector housing with an area of intersection as defined by claim 22, wherein the planar area extends parallel to a longitudinal axis of the high-pressure chamber.

27. The injector housing with an area of intersection as defined by claim 18, wherein an area of transition between the planar area and the high-pressure chamber is rounded.

28. The injector housing with an area of intersection as defined by claim 27, wherein the area of transition between the planar area and the high-pressure duct is rounded.

29. The injector housing with an area of intersection as defined by claim 27, wherein the planar area extends parallel to a longitudinal axis of the high-pressure chamber.

30. The injector housing with an area of intersection as defined by claim 28, wherein the planar area extends parallel to a longitudinal axis of the high-pressure chamber.

31. The injector housing with an area of intersection as defined by claim 18, wherein an area of transition between the planar area and the high-pressure duct is rounded.

32. The injector housing with an area of intersection as defined by claim 31, wherein the planar area extends parallel to the longitudinal axis of the high-pressure chamber.

33. The injector housing with an area of intersection as defined by claim 18, wherein the planar area extends parallel to a longitudinal axis of the high-pressure chamber.

* * * * *